United States Patent [19]

Randar et al.

[11] Patent Number: 4,638,904

[45] Date of Patent: Jan. 27, 1987

[54] ADJUSTABLY POSITIONAL CRANK PIN SUPPORT MEANS FOR WIRE FEEDING APPARATUS

[75] Inventors: Magnus Randar, Menomonee Falls; Terry R. Kroening, Cedarburg, both of Wis.

[73] Assignee: Artos Engineering Company, New Berlin, Wis.

[21] Appl. No.: 749,401

[22] Filed: Jun. 27, 1985

[51] Int. Cl.[4] .............................................. B65G 25/00

[52] U.S. Cl. .................................. 198/468.2; 81/9.51; 83/244; 83/277; 74/600

[58] Field of Search ...................... 198/468.2; 81/9.51; 83/244, 245, 277; 29/33 F, 33 M, 564.6, 753; 140/140; 226/142; 74/600

[56] References Cited

U.S. PATENT DOCUMENTS

| | | | |
|---|---|---|---|
| 1,787,658 | 1/1931 | Andren et al. | 81/9.51 |
| 3,029,494 | 4/1962 | Andren | 81/9.51 |
| 3,863,823 | 2/1975 | Allred | 226/142 |
| 4,350,090 | 9/1982 | Busse et al. | 74/600 |

*Primary Examiner*—Joseph E. Valenza
*Attorney, Agent, or Firm*—James E. Nilles

[57] ABSTRACT

Apparatus which repeatedly severs wire segments from a wire strand and conveys them for further processing comprises a pair of wire feed clamps which are reciprocably movable in opposite directions to feed the wire strand along a first path. The wire feed clamps are affixed to parallel flights of a pulley-supported steel cable which is axially driven back and forth by an oscillatably rotatable cable drum. The cable drum is oscillatably driven by a rack-and-pinion mechanism which includes a drive rod or rack bar reciprocably movable by an orbiting crank pin on a support member which is adjustably mounted on a motor-driven rotatable feed crank. A locking mechanism releasably locks the support member and its crank pin in selected positions relative to the feed crank. The crank pin orbit determines drive rod stroke, cable drum position and wire feed clamp spacing and travel. A feed clamp engaging mechanism engages a wire feed clamp to reposition both wire feed clamps, the cable, the cable drum, the drive rod and the crank pin support member and its crank pin relative to the feed crank to thereby change feed clamp spacing and travel. The locking mechanism unlocks to enable the drive rod to reposition the crank pin support member. An electronic system controls wire processing operations and repositioning operations.

9 Claims, 8 Drawing Figures

ADJUSTABLY POSITIONAL CRANK PIN SUPPORT MEANS FOR WIRE FEEDING APPARATUS

FIELD OF USE

This invention relates generally to adjustable apparatus for repeatedly cutting wire segments of desired length from a continuous strand of wire and for conveying the cut segments for further processing. In particular, it relates to improved adjustably positionable crank pin support means for such apparatus.

DESCRIPTION OF THE PRIOR ART

U.S. Pat. No. 3,029,494 assigned to the same assignee as the present patent application discloses prior art apparatus for feeding a continuous strand of wire along a first path, for repeatedly cutting wire segments from the free end of the strand of wire, and for conveying the cut segments along a second path perpendicular to the first path to various processing machines which perform processing operations on the ends of the cut segments, such as attaching terminals. Owner Manual and Parts List Number A-502 published by the aforesaid assignee discloses in detail the construction and mode of operation of a current commercial embodiment of the invention disclosed in that patent, namely, a Model CS-9AT-50 Automatic Wire Cutting, Stripping and Terminal Attaching Machine. That prior art machine generally comprises a stationary main machine table supported on legs, a wire feed mechanism and a wire cutting and stripping mechanism mounted on the left-hand end of the main machine table. The machine further comprises laterally spaced apart left-hand and right-hand conveyor assemblies (directions as viewed from the discharge end of the conveyor assemblies). Each conveyor assembly comprises a driven endless flexible chain which has conveyor clamps at spaced apart regular intervals therealong. The left-hand conveyor assembly is stationary and is fixedly attached at one end to the main machine table and are supported at its other end by a conveyor leg. The right-hand conveyor assembly, which is adjustably positionable, is releasably locked at one end to the main machine table and is supported at its other end by a conveyor leg which has a roller at its lower end which engages a floor track. The right-hand conveyor assembly is adjustably movable, i.e. adjustably positionable in various fixed positions, relative to the main machine table and to the other conveyor assembly, when unlocked, by means of a manually operable conveyor propelling hand-wheel. The aforementioned processing machines are mounted on tables associated with the conveyor assemblies.

The wire feed mechanism comprises a flexible steel cable which is supported on pulleys above the main machine table and arranged to provide two parallel oppositely movable cable flights. The ends of the cable are attached to an oscillatably rotatable cable drum which is located at and above the right-hand end of the main machine table. A pair of wire feed clamps are connected to the cable by bolt/nut assemblies, one clamp on each cable flight, and during operation the feed clamps are reciprocably movable in opposite directions relative to one another along the aforesaid first path as the cable flights reciprocably move in response to oscillation of the cable drum. During operation, each feed clamp moves back and forth between two extreme locations or positions (i.e., a wire gripping position and a wire-releasing position) as the cable drum is rotatably driven back and forth between start and stop positions. Means are provided to oscillatably rotate or drive the cable drum and comprise a gear box assembly which is located at the left-hand end of the main machine table and a rotatable power output shaft which extends from the upper side of the gear box. The power output shaft (which is rotatably driven by an electric motor, through a geneva gear mechanism and a power input shaft connected to the gear box assembly), rotates in one direction but intermittently dwells or stops at 180° intervals to allow time for wire strand severance. The power output shaft of the gear box is connected to rotatably drive a feed crank which has a crank pin thereon which orbits the power output shaft. A reciprocably movable drive rod, which has one end pivotally connected to the crank pin, is provided at its opposite end with a row of teeth or a "rack" which engages a gear which, in turn, oscillatably drives the cable drum. The crank pin can be adjustably positioned manually on the feed crank to change the stroke length of the drive rod.

Each feed clamp, when it reaches the left-hand one of its extreme positions (i.e., the wire-gripping position), grips the free end of a strand of insulated wire supplied from a wire reel, advances it for a predetermined distance along the first path to its other or right-hand extreme position (i.e., the wire-releasing position), presents the strand to a pair of aligned conveyor clamps in the two spaced-apart conveyor assemblies which grip the strand, and then, while the feed clamp is still in its right-hand extreme position, the feed clamp releases the strand. Thereupon, a wire segment of predetermined length (now gripped by two aligned conveyor clamps) is cut from the strand and stripped by the wire cutting and stripping mechanism. Then, the cut wire segment is advanced by the two conveyor assemblies (which start and stop in unison) along the second path for further processing and discharge from the conveyor assemblies. The length of travel of each feed clamp determines wire segment lengths and is related to (but slightly greater than) the lateral spacing between the aligned pair of conveyor clamps. The length of feed clamp travel determines the length of the wire segment cut from the strand.

In afore-described prior art apparatus, three time-consuming manual operations or manipulations are required in order to change the length of the wire segment to be cut from the wire strand.

First, to change the stroke of the drive rod, the nut clamping the crank pin to the feed crank must be loosened by means of an open-end wrench. A Speed-Wrench is then used to move the crank pin to a new desired length-wise position on the feed crank indicated by a scale on the feed crank. Second, the feed clamps which are connected by nut/bolt assemblies to the cable must be reset to new positions relative to the cable. Since the initial setting is usually quite coarse, it is frequently necessary to repeat these operations at least twice in order to obtain a definite, accurate length setting. Third, when the desired length setting is obtained, and verified by actual trial run of cutting a wire segment, the right-hand adjustably positionable conveyor assembly must be repositioned to suit the new length of wire segment to be processed. This repositioning is also a manual operation and involves unlocking the right-hand conveyor assembly from the main machine table, and, by means of the manually operable conveyor propelling handwheel, propelling the right-hand conveyor assembly into the desired position and relocking it there. These operations normally take a skilled operator about 15 minutes to perform. Because of this, scheduling problems can arise with respect to planning of production runs and much additional time, effort and money can be wasted whenever the apparatus needs to be set up to produce wire segments of different lengths for different production runs.

SUMMARY OF THE INVENTION

Apparatus which repeatedly severs wire segments from a wire strand and conveys them for further processing comprises wire feed means including a pair of wire feed clamps which are reciprocably movable in opposite directions to feed the wire strand along a first path and conveyor means including a pair of laterally spaced-apart conveyor assemblies, each having conveyor clamps for receiving the wire strand and for conveying wire segments cut from the strand along a second path. A wire cutter mounted on one of the conveyor assemblies severs the wire segment after the strand is gripped by an aligned pair of conveyor clamps and released by a wire feed clamp. The wire feed clamps are affixed to parallel flights of a pulley-supported steel cable which has its ends attached to an oscillatably rotatable cable drum. The cable drum is oscillatably driven by a rack-and-pinion mechanism which includes a drive rod or rack bar reciprocably movable by an orbiting crank pin. The crank pin is mounted on a crank pin support member which is adjustably mounted on a motor-driven rotatable feed crank. A locking mechanism releasably locks the crank pin support member and its crank pin in selected positions relative to the feed crank. The stroke of the drive rod is determined by the crank pin orbit and establishes the angular position and movement of the cable drum and this determines spacing and travel of the wire feed clamps. A motor-driven rotatable threaded shaft is connected between and selectively moves the two conveyor assemblies toward or away from each other so that the aligned pairs of conveyor clamps can accommodate wire segments of different lengths. A feed clamp engaging mechanism located on one of the conveyor assemblies engages one wire feed clamp during conveyor adjusting movement and correspondingly repositions both wire feed clamp, the cable (and thus the other wire feed clamp), the cable drum, the drive rod and the crank pin support member and its crank pin relative to the feed crank to thereby change feed clamp spacing and travel so that a different length of the wire strand is fed to the conveyor clamps by the wire feed clamps. The locking mechanism unlocks during conveyor movement to enable the drive rod to reposition the crank pin support member relative to the feed crank. A control system operates the wire feed clamps and conveyor assemblies during wire processing operations and rotates the threaded shaft and operates the feed clamp engaging mechanisms and locking mechanism during repositioning operations.

Apparatus in accordance with the invention offers several important advantages over the prior art. For example, repositioning of the conveyor assemblies and the wire feed clamps is accomplished automatically, quickly and with great precision. Time-consuming, error-prone manual adjustments are eliminated, as are time-consuming and wasteful cut-and-try methods formerly needed to achieve precision in wire segment lengths. Manual repositioning of the wire feed clamps relative to the steel cable on which they are mounted is eliminated. Manual repositioning of the conveyor assemblies is also eliminated, as is manual repositioning of the crank pin relative to the feed crank. Adjustments are accomplished so easily and quickly that successive production runs of wire segments of different sizes and quantities are practical. Repositioning of various components occurs simultaneously, further reducing the time needed for readjustment. Location of the cutter on one of the movable conveyors rather than on the main table ensures that the cutter is always in the proper position relative to the wire feed clamps and enables simultaneous and automatic repositioning of both wire feed clamps. Such location of the cutter also ensures that it is always in proper position relative to the associated conveyor clamps regardless of the position of the conveyor assemblies. The direct mechanical connection between the conveyor assemblies and the wire feed clamps, effected by the selectively operable conveyor clamp engaging mechanism, ensures that precise correspondence between repositioned components will always occur. The length and number of the wire segments to be cut can be programmed into the controller and the actual length of the cut segments can be monitored to an accuracy as great as 1/10 of an inch and displayed as a digital read-out on the controller. Use of an electro-cam device and an encoder to provide electrical control signals eliminates the need for numerous limit switches at various locations which would otherwise be required to achieve proper sequencing, timing and other control functions. The mechanisms required to achieve repositioning of components are relatively simple and straightforward in design and mode of operation thereby reducing the risk of mechanical and electrical failures. Other objects and advantages will hereafter appear.

DRAWINGS

DESCRIPTION OF A PREFERRED EMBODIMENT

General Arrangement

Figure 1:
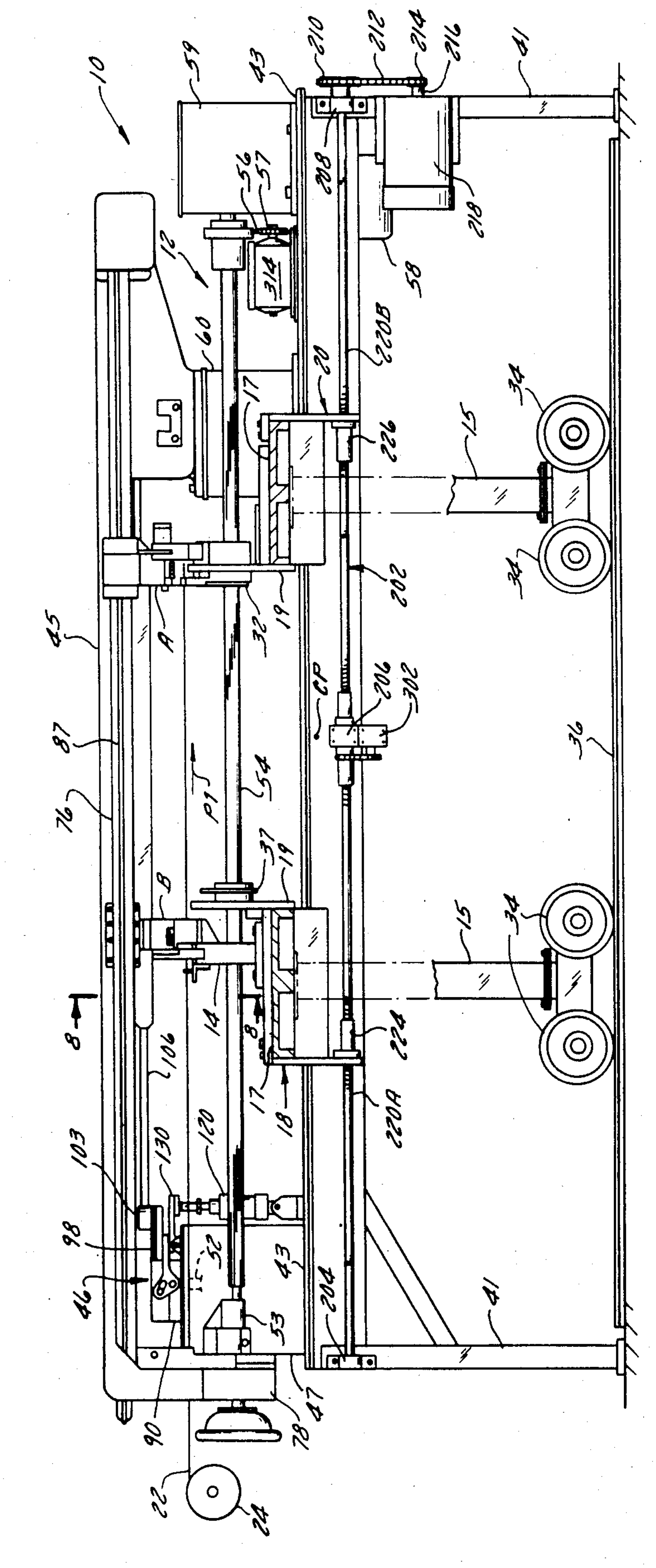
FIG. 1 is a front elevation view of apparatus in accordance with the invention including a supporting framework, wire feed means and a pair of adjustably positionable conveyor assemblies.

Apparatus 10 which repeatedly severs wire segments W from a wire strand 22 and conveys them for further processing comprises a pair of wire feed clamps A and B which are reciprocably movable in opposite directions to feed the wire strand 22 along a first path P1 and a pair of laterally spaced-apart conveyor assemblies 18 and 20, each having conveyor clamps 26 for receiving the wire strand 22 and for conveying wire segments W cut therefrom along a second path P2. A wire cutter 14 mounted on conveyor assembly 18 severs the wire segment W after the strand 22 is gripped by an aligned pair of conveyor clamps 26 and released by a wire feed clamp A or B. The wire feed clamps A and B are affixed to parallel flights 87 and 89 of a pulley-supported steel cable 80 which has its ends attached to an oscillatably rotatable cable drum 44. The cable drum 44 is oscillatably driven by a rack-and-pinion mechanism which includes a drive rod or rack bar 106 reciprocably movable by an orbiting crank pin 103 on a crank pin support member 98 which is adjustably mounted on a motor-driven rotatable feed crank 90. A locking mechanism 46 releasably locks the support member 98 and its crank pin 103 in selected positions relative to the feed crank 90. The stroke of the drive rod or rack bar 106 is determined by the crank pin orbit and establishes the angular position and movement of the cable drum 44 and this determines spacing and travel of the wire feed clamps A and B. A motor-driven rotatable threaded shaft 202 is connected between and selectively moves and repositions the two conveyor assemblies 18 and 20 toward or away from each other so that the aligned pairs of conveyor clamps 26 can accommodate wire segments of different lengths. Feed clamp engaging mechanism 232 located on the conveyor assembly 18 engages the wire feed clamp during conveyor adjusting movement and correspondingly repositions both wire feed clamps A and B, the cable 80, the cable drum 44, the drive rod or rack bar 106 and the crank pin support member 98 and its crank pin 103 relative to the feed crank 90 to thereby change feed clamp spacing and travel so that a different length of the wire strand 22 is fed to the conveyor clamps 26 by the feed clamps A and B. The locking mechanism 46 unlocks during conveyor movement to enable the drive rod or rack bar 106 to reposition the crank pin support member 98 relative to the feed crank 90. A control system 300 operates the wire feed clamps A and B and conveyor assemblies 18 and 20 during wire processing operations and rotates the threaded shaft 202 and operates the feed clamp engaging mechanism 232 and locking mechanism 46 during repositioning operations.

Conveyor Means

Figure 2:
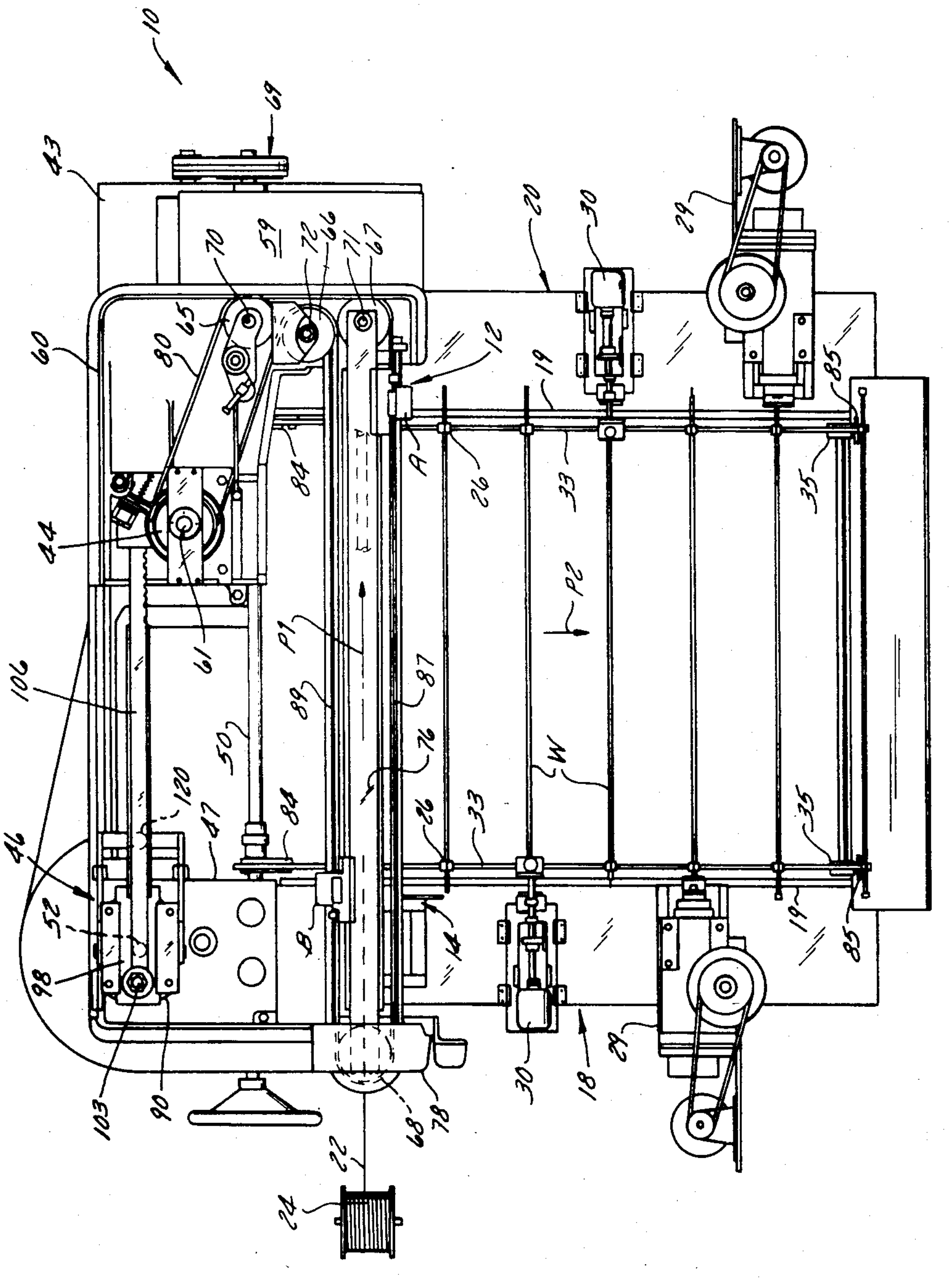
FIG. 2 is a top plan view, in reduced scale, of the apparatus of FIG. 1.
Figure 3:
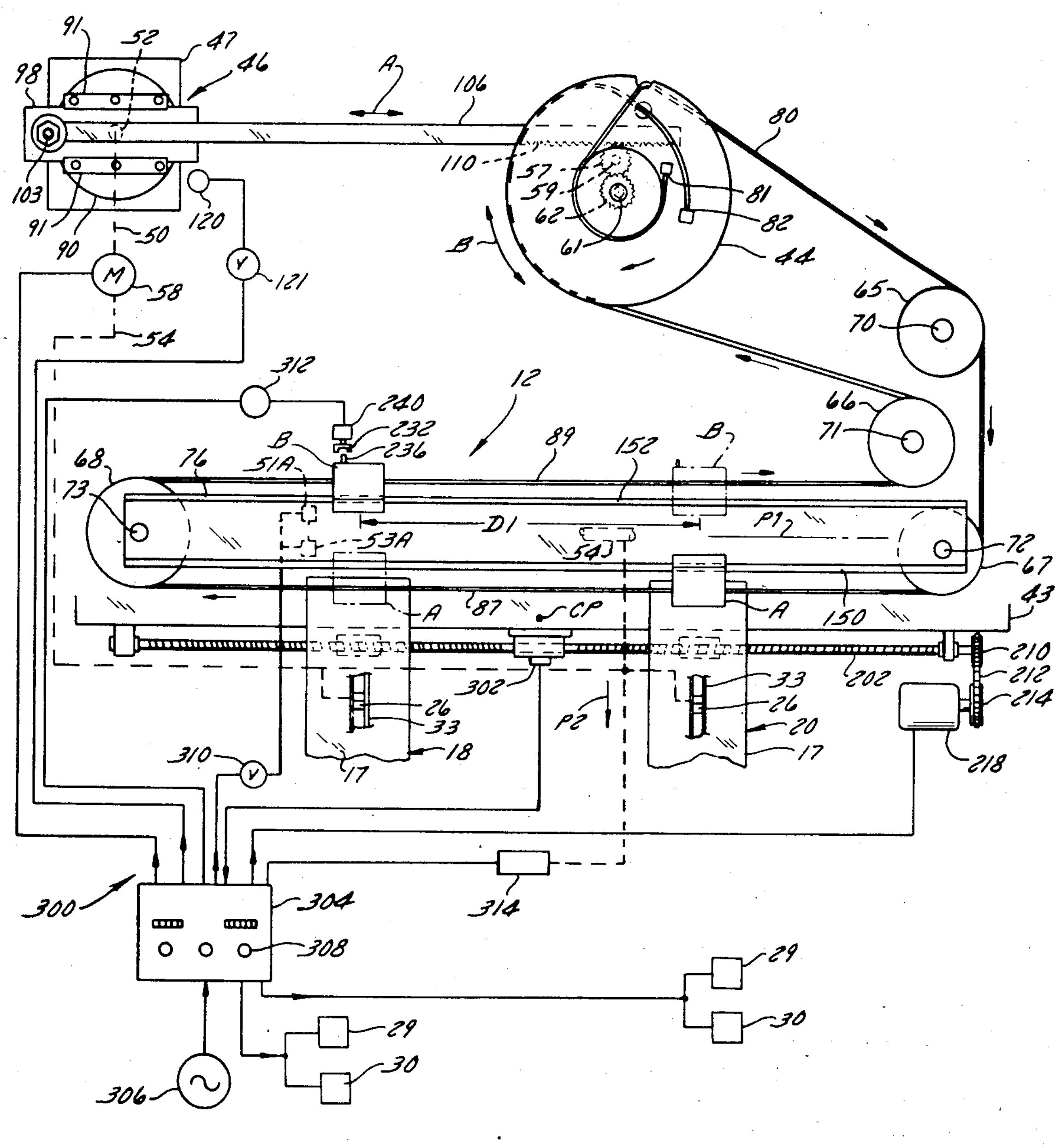
FIG. 3 is an enlarged schematic top plan view of a portion of the wire feed means and conveyor assemblies shown in FIG. 2 illustrating their operation and showing control means therefor.

Referring to FIGS. 1, 2 and 3, apparatus 10 in accordance with the present invention generally comprises a rigid supporting structure in the form of a flat horizontal main table 43 having ground-engaging supporting legs 41. A wire feed means or mechanism 12, including wire feed clamps A and B, is mounted on table 43 for intermittently feeding a wire strand 22 from a wire supply reel 24 along a first path P1 above and parallel to main table 43.

Figure 8:
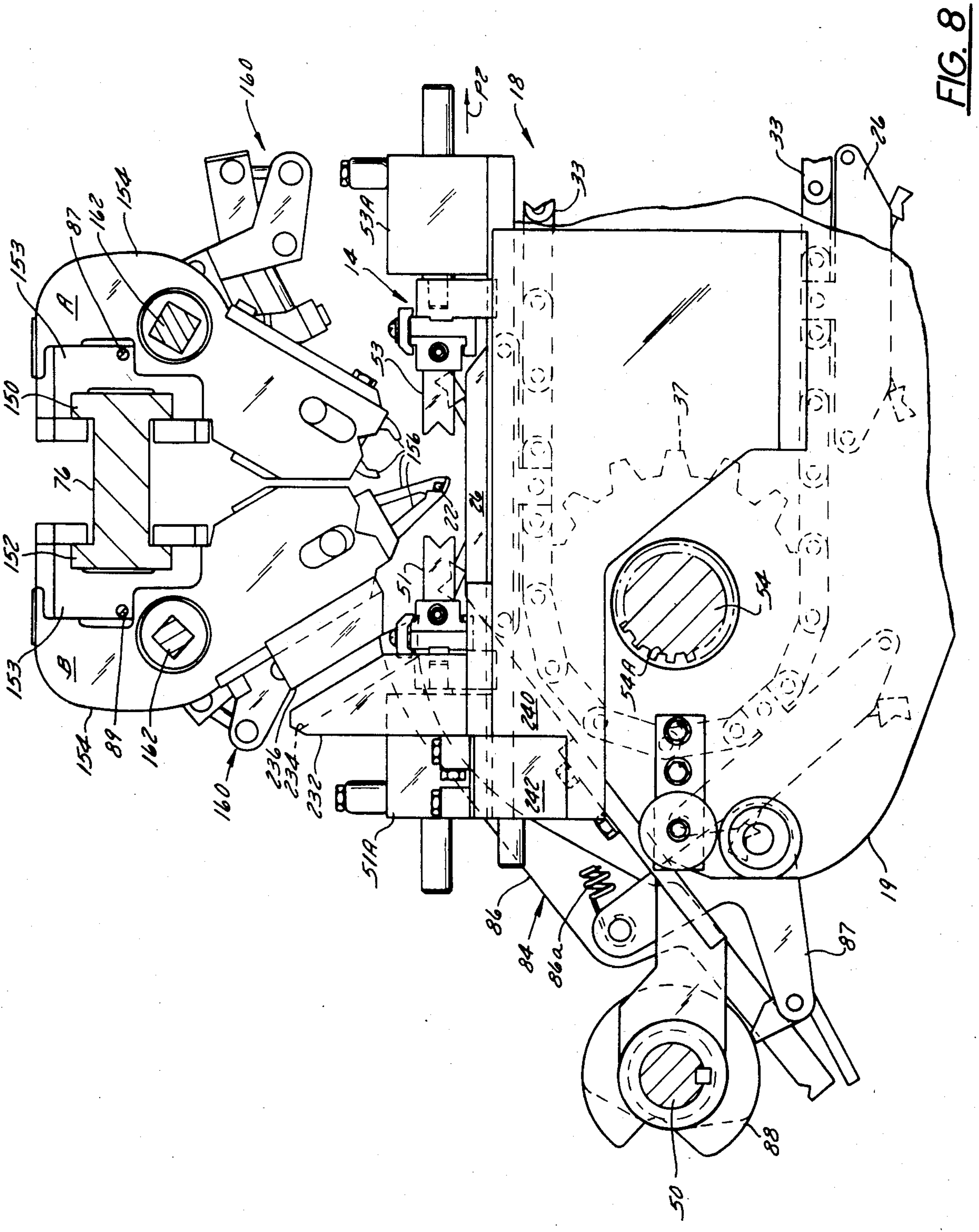
FIG. 8 is a greatly enlarged side elevation view, partly in cross-section, of one of the wire feed clamps taken on line 8—8 in FIG. 1.

Conveyor means are provided for conveying wire segment W cut from wire strand 22 along a second path P2 (transverse to path P1) for further processing operations. The conveyor means comprise two conveyor assemblies which are designated herein (with respect to FIGS. 1, 2 and 3) as left-side conveyor assembly 18 and right-side conveyor assembly 20. Each conveyor assembly 18 and 20 comprises conveyor clamps 26, hereinafter described, and a flat horizontal conveyor table 17 which has one end movably associated with main table 43 and which has its other end supported by a conveyor leg 15 which is provided at its lower end with rotatable wheels 34 which engage and roll upon a floor-mounted guide rail 36. A wire cutter mechanism 14 is mounted on left-side conveyor table 17 near the path P1 for severing wire segments W from strand 22. The cutter blades 51 and 53 of cutter mechanism 14, which when closed intersect path P1, are located between a "start wire feed" position of wire feed clamps A and B and the conveyor clamps 26 of left-side conveyor assembly 18. As FIG. 8 shows, the cutter blades 51 and 53 are actuated between open and closed positions by pneumatic cutter blade actuators 51A and 53A, respectively, which are synchronized to operate in response to the position and condition of the active pair of conveyor clamps 26, as well as the wire feed clamps A and B. As FIG. 2 shows, for carrying out wire processing operations on the ends of each wire segment W, a conventional wire stripping mechanism 30 and a conventional terminal attachment mechanism 29 are mounted on left-hand conveyor table 17 downstream of wire cutter mechanism 14. A wire stripping mechanism 30 and terminal attachment mechanism 29 are also provided on right-hand conveyor table 17. As FIG. 8 makes clear, each conveyor assembly 18 and 20 further comprises an elongated guide plate 19 for supporting a rotatable driven sprocket 37 located near the conveyor in-feed end (close to main table 43), for supporting a rotatable idler sprocket 35 located near the conveyor discharge end, and for guiding an endless flexible conveyor chain 33 reeved around the sprockets. Each chain 33 has conveyor clamps 26 mounted at intervals therealong and each conveyor clamp 26 is closed and opened by a conveyor clamp closing actuator 84 (FIG. 8) mounted on its respective conveyor assembly 18 or 20 and a conveyor clamp opener 85 (FIG. 2) mounted on its respective conveyor assembly 18 or 20 when the conveyor clamp reaches certain positions, as hereinafter described.

As FIG. 8 shows, each conveyor clamp closing actuator 84 effects closing movement of each associated conveyor clamp 26 after that conveyor clamp is advanced to a position intersecting path P1 wherein it stops and receives wire strand 22 fed by the wire feed clamps A or B. When strand 22 is properly positioned and stationary, two aligned clamps 26 in the conveyor assemblies 18 and 20 close, the wire strand 22 is severed by cutter mechanism 14 and the wire segment W is advanced along path P2 in steps by the aligned pair of closed conveyor clamps 26 in which it is gripped. Each conveyor clamp closing actuator 84 is mounted on a respective conveyor assembly 18 and 20 and is laterally movable therewith. Each conveyor clamp opener 85 is located at the discharge end of its associated conveyor assembly 18 or 20 and effects opening of the conveyor clamp 26 and release of a finished wire segment W at the end of path P2. As FIG. 8 shows, each conveyor clamp closing actuator 84 comprises a movable arm 86 which is moved (to the right in FIG. 8) to effect conveyor clamp closure by means of a biasing spring 86a in response to movement of a pivotably movable bell-crank 87 which engages a rotatable cam 88. Cam 88 is rigidly secured to and rotatable with a power input shaft 50, hereinafter described, so as to synchronize closure of conveyor clamp 26 with the positions of the wire feed clamps A and B. The conveyor clamps 26, the clamp actuators 84 and the clamp openers 85 could take the form of those disclosed in aforementioned U.S. Pat. No. 3,029,494.

A first electric motor 58 is mounted beneath the right end of main table 43 (FIG. 1) to drive the wire feed mechanism 12 to drive the driven sprockets 37 of the conveyor assemblies 18 and 20 and to effect operation of the conveyor clamp closing actuators 84. During wire processing operation, motor 58 runs continuously in one direction and drives a geneva gear box 59 mounted on the right end of main table 43 by means of a pulley and drive belt assembly 69 (FIG. 2).

Geneva gear box 59, in turn, drives the elongated power input shaft 50 (only partially visible in FIGS. 1 and 2) which has one end operatively connected to the geneva gear box 59 and has its other end connected to the input side of a power transmission mechanism 47 which is mounted on the left end of main table 43. Geneva gear box 59 causes power input shaft 50 to rotate continuously in one direction.

Power transmission mechanism 47 has a power output shaft 52 on its upper side which rotates at a slower speed than power input shaft 50 and dwells at certain 180° intervals. As FIG. 3 shows, output shaft 52 is adapted to drive a rotatable feed crank 90 which is shown in one dwell position in FIGS. 3, 4 and 5. Feed crank 90, in turn, carries a crank pin 103 which drives a rack-and-pinion mechanism which includes an elongated reciprocably movable toothed rack bar 106 and a rotatable roller gear 57 which is engaged with rack bar teeth 110 on rack bar 106. A rotatable pinion gear 62 is meshed with gear 57 and connected to an oscillatably rotatable cable drum 44. A flexible steel cable 80 is driven by the cable drum 44, and the wire feed clamps A and B are affixed to and movable with the parallel cable flights 87 and 89, respectively, of cable 80 as hereinafter described in detail.

Geneva gear box 59 also drives an elongated splined power shaft 54 which has one end operatively connected to the geneva gear box 59 and has its other end rotatably supported on a bearing assembly 53 mounted on the outside of transmission 47. Geneva gear box 59 causes splined shaft 54 to rotate in one direction but only intermittently, i.e., through certain angular distances at certain time intervals. Splined shaft 54 is slidably received in correspondingly splined holes 54A in the driven sprockets 37 of the conveyor assemblies 18 and 20 and is adapted to rotate those sprockets and operatively drive the conveyor chains 33 to convey wire segments W in incremental steps along path P2 (in timed relationship with components driven by power output shaft 50). Since shaft 54 is in splined engagement with sprockets 37, it enables the conveyor assemblies 18 and 20 to be moved laterally toward or away from each other for adjustment purposes as hereinafter explained.

Conveyor Repositioning Means

As FIGS. 1 and 3 show, the means to laterally move and reposition the conveyor assemblies 18 and 20 (which are always equidistantly located on opposite sides of a center point or reference point CP on main table 43) comprise a second reversible electric motor 218 which is rigidly mounted on the right leg 41 of table 43. Motor 218 has a drive shaft 216 on which a drive sprocket 214 is mounted and the latter is connected by an endless flexible drive chain 212 to a driven sprocket 210 which is connected to the right end of an elongated threaded conveyor position adjustment screw 202. Screw 202 is horizontally supported along the front edge of main table 43 for rotation in opposite directions by three mounting brackets 204, 206 and 208 (each containing suitable anti-friction bearings). Screw 202 has oppositely threaded portions 220A and 220B which extend through and threadedly engage non-rotatable sleeves 224 and 226, respectively, which contain ball-screws providing a threaded connection and are rigidly secured to the conveyor tables 17 of the conveyor assemblies 18 and 20. Thus, rotation of screw 202 is one or the other direction by reversible motor 218 causes the conveyor assemblies 18 and 20 to move toward or away, respectively, from each other. A commercially available electronic encoder device 302, which is part of an electronic control system 300 (FIG. 3), is mounted on bracket 206 and screw 202 is connected to drive device 302. Device 302 senses each rotation of screw 202 (and its direction) and sends an electric signal representative thereof to a controller 304, hereinafter described.

Wire Feed Means

Referring to FIGS. 1, 2 and 3, the wire feed mechanism 12 will now be described in detail. A cable drum support structure 60 in the form of a strong steel casting is rigidly mounted on the upper side of main table 43 near the right end thereof. A bracket assembly or support structure 78 is rigidly mounted on the outside of transmission mechanism 47 above and near the left end of main table 43. A sheet metal shroud or housing 45 (shown in FIG. 1 but removed in FIGS. 2 and 3) is mounted on the support structures 60 and 78 to enclose components hereinafter described. An elongated horizontally disposed rigid slide bar 76, of H-shaped cross-section as FIG. 8 shows, is rigidly connected to, supported by and extends between the support structures 60 and 78 above main table 43. Cable drum support structure 60 supports a rotatable cable drum axle 61, a roller gear axle 59 and rotatable three pulley axles 70, 71 and 72 and the other support structure 78 supports a rotatable pulley axle 73. Axle 61 supports pinion gear 62 which is rigidly secured to and effects rotation of cable drum 44. Axle 59 supports roller gear 57 which meshes with pinion gear 62 and engages the teeth 110 of rack bar 106. The four pulley axles 70, 71, 72 and 73 support pulleys 65, 66, 67 and 68, respectively, around which cable 80 is reeved. The ends of cable 80, which is understood to be wrapped around drum 44 for several turns, are rigidly secured to cable drum 44 at the locations 81 and 82 thereon. Cable 80 has a portion or cable flight 87 extending between pulleys 67 and 68 and wire feed clamp A is rigidly affixed thereto. Cable 80 also has a portion or cable flight 89 (parallel to and spaced from cable flight 87) extending between pulleys 68 and 66 and wire feed clamp B is rigidly affixed thereto. As FIG. 8 shows, the wire feed clamps A and B are also slidably engaged with the flanged front and rear edges 150 and 152, respectively, of slide bar 76 which guides them along path P1.

Referring to FIGS. 1 through 7, the rack bar 106, which has teeth 110 at one end, is provided with a hole 108 at its other end, with a bushing 112 therein, for pivotally receiving a crank pin 103 which, as FIGS. 4–7 show, is threaded to receive a nut 114 and accommodates a washer 115. The crank pin 103 is rigidly mounted on and near one end of an elongated crank pin support member 98. The crank pin support member 98 is mounted on rotatable drive crank 90 and is rotatable therewith but is adapted to be slidably moved to various positions relative thereto in which it can be releasably locked, as hereinafter explained. When crank pin support member 98 is so locked, the crank pin 103 describes a circular 360° orbit around the axis of rotation of power output shaft 52 on power transmission mechanism 47 as shaft 52 rotates 360°. This imparts reciprocating motion (arrow A in FIG. 3) to rack bar 106, first in one direction and then in the other, and causes cable drum 44 to oscillatably rotate (arrow B in FIG. 3), first in one direction and then in the other. As drum 44 so rotates, the cable flights 87 and 89 shift axially back and forth in opposite directions relative to each other and the wire feed clamps A and B exhibit corresponding motion.

As will be understood, the distance between the axis of rotation of power output shaft 52 and the axis of crank pin 103 (i.e., the radius of its orbit) determines the distance which rack bar 106 travels longitudinally when moving in one direction (which distance or stroke length equals the diameter of the orbit). In FIG. 3, for example, crank pin 103 and rack bar 106 are shown in a typical "start stroke" position and this position also determines the angular "start" position of cable drum 44, and the "start" position of cable 80. In this position wire feed clamp B (solid lines) is in its "start wire feed" position and wire feed clamp A (solid lines) is in its "end wire feed" position. When crank pin 103 has orbited clockwise 180° from the position shown in FIG. 3, rack bar 106 is moved to the right and cable drum 44 is rotated counterclockwise a certain angular distance (typically several revolutions) from the angular position shown in FIG. 3 to its angular "end" position. This causes corresponding movement of cable 80 and wire feed clamp B moves to the right through distance D1 (FIG. 3) to its "end wire feed" position (phantom lines), whereas wire feed clamp A moves to the left through distance D1 to its "start wire feed" position, as FIG. 2 shows. When crank pin 103, after a short dwell period, orbits clockwise for an additional 180° (thus having orbited a full 360° and completed one cycle of operation), the rack bar 106, cable drum 44, cable 80, and wire feed clamps A and B all have moved in the direction opposite to that described and return to the positions shown in FIG. 3.

As will be further understood, changing the orbit of crank pin 103 by repositioning crank pin support member 98 on drive crank 90 has the effect of changing the "start" and "end" angular positions of cable drum 44 and also changes the "start" and "end" positions of both wire feed clamps A and B and the distance D1 therebetween.

The distance D1 in FIG. 3 is the same as the length of a wire segment W to be cut from wire strand 22 but is slightly greater than the lateral distance between an associated aligned pair of conveyor clamps 26 in the conveyor assemblies 18 and 20 which are in position to receive the strand. This is due to the fact that the cutter blades 51 and 53 sever the wire strand 22 at a point between a conveyor clamp 26 on left side conveyor 18 and the "start wire feed" position of the wire feed clamps A and B. To accomplish a change in the distance D1, the conveyor assemblies 18 and 20 are laterally moved relative to each other, as hereinbefore described, to achieve some desired spacing therebetween.

Wire Feed Clamp Engagement Means

As FIG. 8 shows, wire feed clamp engagement means are provided on the conveyor assembly 18 for releasably engaging the wire feed clamp B as the conveyor assemblies 18 and 20 are moved to thereby cause cable 80 and the wire feed clamp A attached thereto to be moved in synchronism therewith. Such means for engaging wire feed clamp B comprise a block 232 having a slot 234 formed therein for receiving a projection 236 provided on body 154 of wire feed clamp B. Block 232 is slidably mounted on a support frame 240 which is part of conveyor assembly 18. Block 232 is shown in disengaged position in FIG. 8 but is slidably movable therefrom rightward to an engaged position wherein its slot 234 receives projection 236 on wire feed clamp B. Block 232 is movable between its engaged and disengaged positions by means of pneumatic motor 242 which is mounted on support frame 240 and is controlled by control system 300. Pneumatic motor 242 is energized and causes block 232 to engage clamp B whenever a change in conveyor assembly spacing is to be effected. When block 232 engages clamp B and conveyor assembly 18 is adjustably moved laterally by screw 202, the clamp A and the cable flight 87 to which it is attached are also moved, thereby causing cable 80 to shift axially and effect repositioning of cable drum 44, as hereinbefore described. This effects simultaneous adjusting movement, but in the opposite direction, of cable flight 87 and its associated wire feed clamp A. Axial shifting of the cable 80 causes drum 44 to rotated in the appropriate direction for a short angular distance to some new predetermined angular start/stop position. Such rotation of drum 44 causes rotation of pinion gear 62 and roller gear 57 and this, in turn, causes axial shifting of rack bar 106 and sliding movement of crank pin support member 98 relative to drive crank 90. Such movement is possible if member 98 is being maintained in unlocked condition (FIG. 7) by a pneumatic actuator 120. When conveyor assemblies 18 and 20 are spaced apart by some desired distance, rotation of screw 202 is stopped, member 98 is locked in its new position (FIG. 6) relative to drive crank 90 and the block 232 is disengaged from the wire feed clamp B. Thus, when wire feed mechanism 12 is again operated to effect wire processing, the repositioned feed clamps A and B cause a different length of the wire strand 22 to be presented to the laterally repositioned conveyor clamps 26.

Wire Feed Clamps

As FIG. 8 shows, clamps A and B are similar to each other but reversely disposed to each other. Therefore, only clamp A is hereinafter described in detail. Clamp A comprises a body or frame 154 which is provided with a low-friction flange-engaging roller or runner assembly 153 for engaging slide bar 76 and to which cable flight 87 is rigidly secured. Frame 154 is provided at its lower end with a pair of wire-engaging clamp members 156 which are movable between an extended (closed, wire-gripping) position (see clamp B in FIG. 8) and a retracted (open, wire-released) position (see clamp A in FIG. 8). Since the tips of each pair of clamp members 156 of wire feed clamps A and B traverse path P1 during wire feeding operations, the clamp members 156 are retracted when moving from wire-release to wiregripping positions to prevent interference with the other pair of extended (closed) clamp members 156. The frame 154 is provided with a toggle mechanism 160 which effects open/close movement and retract/extend movement of the clamp members 156. Toggle mechanism 160 is operated by a selectively rotatable slide rod 162 (of rectangular cross-section) which extends for the length of slide bar 76 and parallel thereto. Slide rod 162 is oscillatably rotated for a predetermined distance (first in one direction and then in the oposite direction) to effect operation of its associated operating mechanism 160 (compare the two mechanism 160 in FIG. 8) and thereby effect operation of its associated clamp members 156. Timed and synchronized rotation of the rod 162 is controlled by a mechanism (not shown) driven from transmission mechanism 47 in synchronism with each clamp A and B reaching its extreme limits of travel, as described in U.S. Pat. No. 3,029,494.

Releasable Locking Means

As FIGS. 4 through 7 show, the releasable locking means or mechanism 46 for crank pin support member 98 is constructed and operate as follows. Drive crank 90 is provided on its upper side with a pair of spaced apart side rails 91 and a center rail 92 therebetween. Center rail 92 is rigidly secured to drive crank 90 by bolts 94, side rails 91 are loosely secured to drive crank 90 by bolts 93 and can be selectively moved up (locked) or down (unlocked). Each side rail 91 has a groove 96 on its inner side. Center rail 92 has an upwardly extending trapezoidally-shaped tongue 95 on its upper side.

Figure 6:
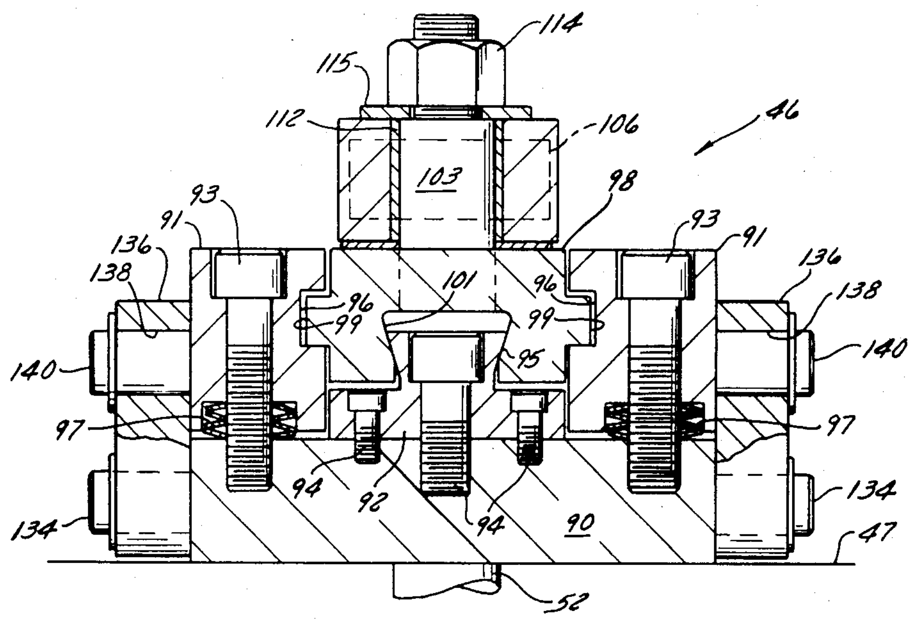
FIG. 6 is a greatly enlarged cross-section view of the mechanism taken on line 6—6 of FIG. 4 and showing the mechanism components in one (locked) operative condition.
Figure 7:
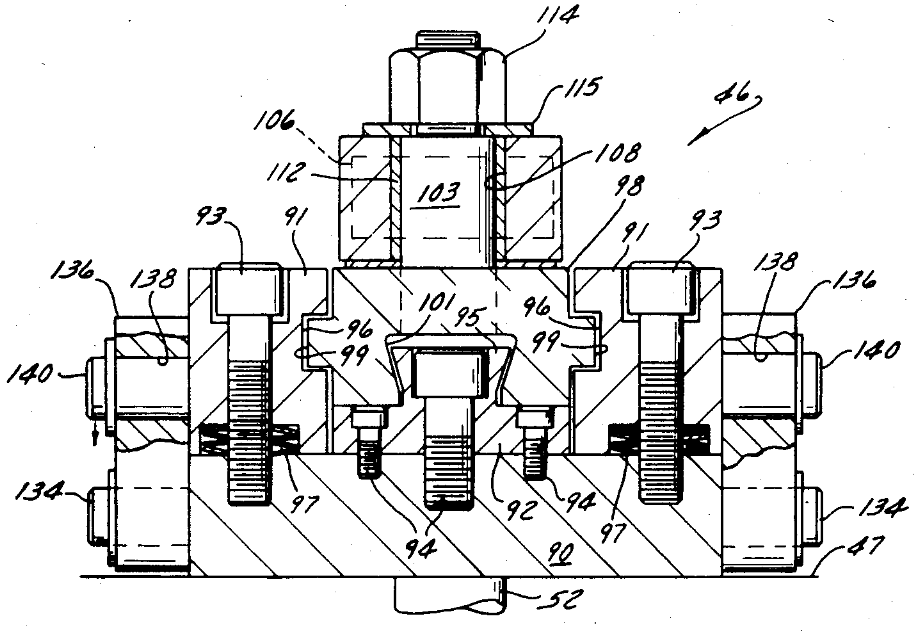
FIG. 7 is a view similar to FIG. 6 but showing the mechanism components in another (unlocked) operative condition.

The crank pin support member 98 is slidably mounted between the side rails 91 and over center rail 92. Member 98 has outwardly extending tongues 99 along its sides which slidably engage the grooves 96 in the side rails 91. Member 98 also has a downwardly opening trapezoidally-shaped groove 101 on its underside which slidably engages tongues 95 of center rail 92 in a "dovetail" joint but which allows space for considerable play in the joint. Member 98, when unlocked by downward movement of the side rails 91 (FIG. 7), is adjustably slidable longitudinally to desired positions relative to drive crank 90 in response to axial movement of rack bar 106 and is releasably locked in a desired longitudinal position when the side rails 91 are moved upward (FIG. 6). Resilient Bellville washers 97 on the bolts 93 bias the side rails 91 upwardly to locked position (FIG. 6) wherein crank pin support member 98 is tightly secured to drive crank 90 as the "dovetail" joint becomes wedged.

Figure 4:
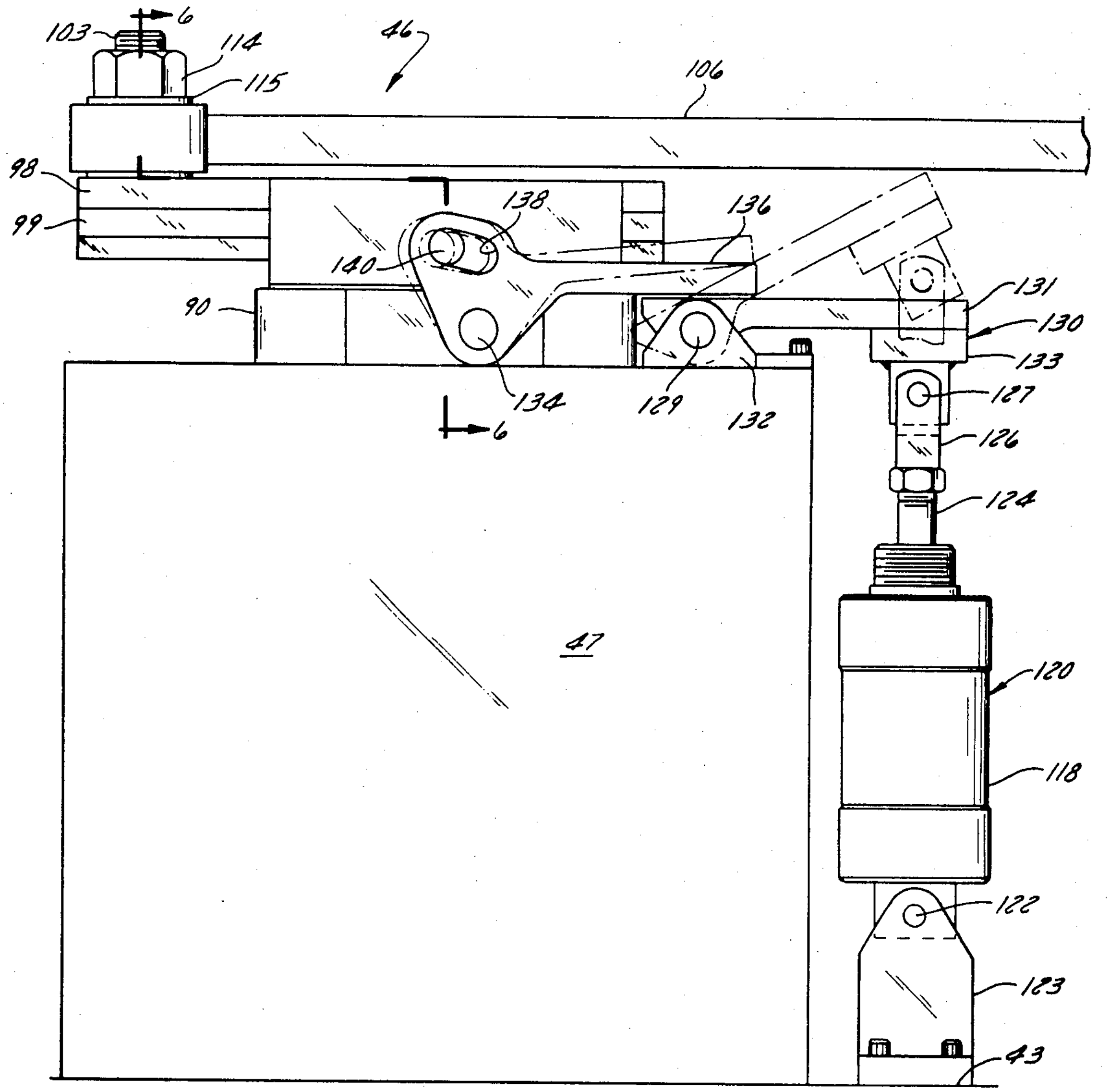
FIG. 4 is a greatly enlarged side elevation view of a cable adjustment mechanism for the wire feed means shown in FIGS. 1, 2 and 3.
Figure 5:
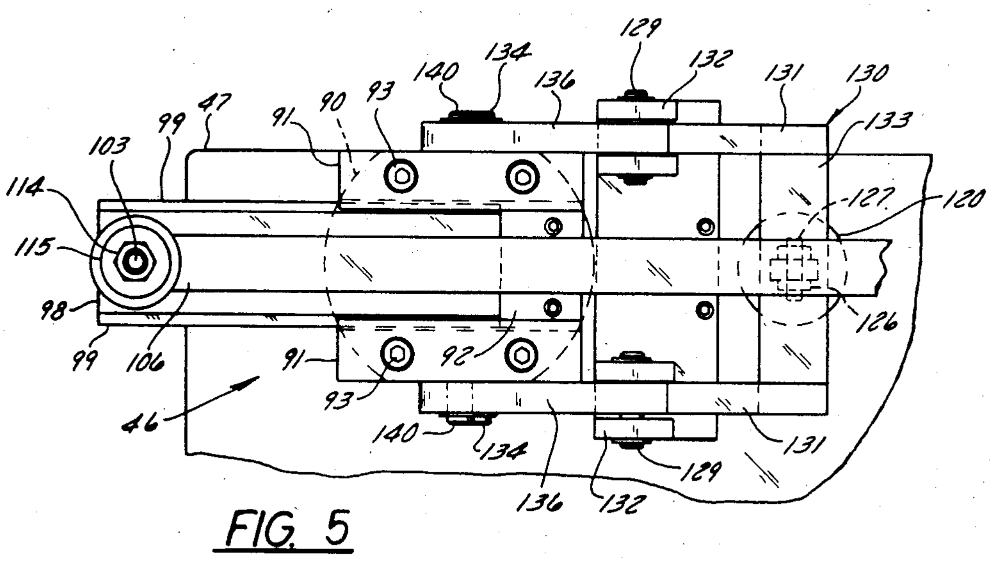
FIG. 5 is a top plan view of a portion of the mechanism shown in FIG. 4.

The side rails 91 are movable downwardly to effect unlocking of crank pin support member 98 by means of a pneumatic actuator 120 which is controlled by an electrically controlled solenoid valve 121 (FIG. 3). As FIG. 4 shows, the lower end of the cylinder 118 of actuator 120 is pivotally connected by a pin 122 to a mounting bracket 123 on table 43. The upper end of the piston rod 124 of actuator 120 is pivotally connected by a clevis 126 and a pin 127 to the outer end of a pivotable intermediate lever 130 which, in turn, operates a pair of main levers 136 which move the side rails 91 downwardly to unlocking position. Intermediate lever 130 comprises a pair of spaced apart arms 131 joined at their outer ends by a cross-member 133 welded thereto. Each arm 131 is pivotally connected by a pivot pin 129 to a bracket 132 on the top of transmission mechanism 47. Drive crank 90 has a pair of rigidly connected outwardly extending pivot pins 134 on opposite sides thereof. Each main lever 136 is pivotally connected at its inner end to a pivot pin 134. When transmission mechanism 47 maintains drive crank 90 in its centered (starting/ending) position (as shown in FIGS. 4 and 5), the outer end of each main lever 136 overlies a corresponding arm 131 of intermediate lever 130. The inner end of each main lever 136 has an elongated hole or slot 138 which receives a pull-down pin 140 which is rigidly secured to the outer side of a side rail 91. As FIG. 4 shows in phantom lines, when the intermediate lever 136 is pivotally raised upwardly for a relatively great distance by actuation (extension) of actuator 120, each main lever 130 is also pivotably raised upwardly but only for a relatively small distance. The lever slots 138 thereby force the pull-down pins 140 downwardly and the attached side rails 91 are also forced downwardly against the upward bias of the resilient washers 97 to the unlocked position (FIG. 7) whereby crank pin support member 98 is only loosely engaged. Conversely, deactivation (retraction) of actuator 120 moves main lever 136 downwardly and allows the resilient washers 97 to move the side rails 91 and support member 98 upwardly (FIG. 6) to locked position. As the side rails 91 and the pins 140 thereon move up, the main levers 136 pivot downwardly to the solid line position shown in FIG. 4.

Crank pin support member 98 is unlocked to allow it to be adjustably positioned longitudinally relative to plate 90; however, it is locked during rotating operation of drive crank 90. The position of member 98 is related to the longitudinal position of rack bar 106 and the angular start-stop position of the cable drum 44.

Control Means

The electronic control system 300, shown schematically in FIG. 3, comprises an electronic controller 304 which receives operating power from a suitable electric power source 306 and distributes it to energize and operate certain system components in accordance with electric input signals from several sources. Controller 304 comprises suitable logic circuits, memory circuits, counter circuits and control circuits (none shown) which effect operation of the apparatus as hereinafter described.

The components energized and operated by controller 304 include: first motor 58 which drives the wire feed mechanism 12 and the conveyor assemblies 18 and 20; solenoid valve 310 which actuates the pneumatic actuators 51A and 53A in wire cutter 14; second motor 218 which controls spacing between the conveyor assemblies 18 and 20; solenoid valve 121 which actuates pneumatic actuator 120 to unlock the crank pin support member 98; the wire stripping devices 30 and the terminal attachment devices 29; and solenoid valve 312 which actuates the pneumatic actuator 242 for actuating the clamp engagement member 232.

The electric input signals to controller 304 are provided by manually operated push button switches 308 on the controller; the electro-cam box 314 which contains sequencing cams (not shown) rotatable in response to rotation of spline shaft 54 to operate switches (not shown) which control the sequence and timing of operation of components in the apparatus; and the encoder 302 which indicates direction of rotation and number of rotations of threaded shaft 202.

During wire feeding, cutting and conveying operations, first motor 58 is continuously operated, the solenoid valves 310 for cutter 14 operates periodically as required and the wire stripping devices 30 and terminal attachment devices 29 also operate periodically as required, i.e. as an end of a wire segment 22 is presented thereto; such periodic operation being timed and sequenced by signals from the electro-cam box 314.

During a set-up operation wherein the apparatus is being adjusted to provide for wire segments of some predetermined new length, first motor 58, cutter solenoid valve 310, and the wire processing devices 29 and 30 are de-energized. Instead, in response to input signals from the push button switches 308, controller 304 effects the following operations. The solenoid valve 121 is energized to unlock the crank pin support member 98; the solenoid valve 312 is energized so that the clamp engagement member 232 on the conveyor assembly 18 engages the feed clamp; the second motor 218 is energized to rotate threaded member 202 and move the conveyor assemblies 18 and 20 to appropriate positions. Repositioning of the conveyor assemblies 18 and 20 effects corresponding repositioning of clamps A and B, as previously explained. When adjusting movement of the conveyor assemblies 18 and 20 is stopped (either by manual operation of the push button switches 308 or in accordance with a program which is responsive to input signals from encoder 302), the solenoid valve 121 is de-energized to effect re-locking of crank pin support member 98 in its new location and the solenoid valve 312 is de-energized to disengage the clamp engagement member 232 from the clamp. Thereafter, operation of first motor 58 for conventional wire processing operation effects movement of feed clamps A and B between the new extreme travel positions.

We claim:

1. Apparatus for feeding a strand of wire comprising:

a pair of wire feed clamps which are connected to a pair of parallel flights of a cable connected to be driven by a cable drum which is oscillatably rotatable between two extreme angular positions, said angular positions determining the axial positions of said parallel cable flights and thus the extreme operating positions and travel distance of each of said wire feed clamps; drive means to oscillatably rotate said cable drum to effect wire feeding movements of said wire feed clamps;

said drive means comprising a motor and a power output shaft rotatably driven about an axis of rotation by said motor;

a feed crank connected to be rotated by said power output shaft;

guide means mounted on said feed crank and movable between locking and unlocking positions;

biasing means biasing said guide means to one of said locked and unlocked positions;

a crank pin support member slidably mounted on and disposed between said feed crank and said guide means and being adjustably positionable in fixed positions wherein it can be releasably locked;

a crank pin mounted on said crank pin support member and having a pin axis which orbits around said axis of rotation as said feed crank rotates;

a reciprocably movable elongated drive rod connected to oscillatably rotate said cable drum, said drive rod being pivotally connected at one end to said crank pin and being drivingly engaged at its other end to rotate said cable drum;

locking means operable to lock and unlock said crank pin support member on said feed crank, said locking means comprising an actuator connected to said guide means and biasing means;

to said guide means and which overcomes the force of said biasing means during movement of said guide means; to unlock said crank pin support member and enable adjustable repositioning of said wire feed clamps, said cable, said cable drum, said drive rod and said crank pin support member so that said wire feed clamps are able to provide a particular length of said wire strand, and said control means being further operable to lock said crank pin support member and entrap said crank pin support member between said guide means and said feed crank and to operate said motor of said drive means to effect wire feeding movements of said wire feed clamps while said crank pin support member is locked.

2. Apparatus according to claim 1 wherein said locking means further includes lever means which comprises a first lever pivotally connected to said actuator and a second lever pivotally connected to said feed crank and adapted to be operated by said first lever, said second lever being further connected to said guide means to effect movement thereof.

3. In apparatus for feeding a wire strand, in combination:

a power transmission mechanism;

a feed crank connected to be rotated by said power transmission mechanism on an axis;

guide means mounted on said feed crank for rotation therewith and movable in the axial direction relative to said feed crank between locked and unlocked positions;

a crank pin support member slidably engaged with guide means for movement in directions transverse to said axis when said guide means are in unlocked position and rotatable therewith when said guide means are in locked position;

a crank pin mounted on said crank pin support member and adapted to orbit said axis;

a reciprocably movable drive rod pivotally connected to said crank pin;

said drive rod being adapted to be reciprocably driven when said feed crank is rotatably driven while said guide means are in locked position;

said drive rod being further adapted to be shifted longitudinally for adjustment purposes when said feed crank is at rest and said guide means are in unlocked position to thereby enable sliding movement of said crank pin support member to thereby change the orbit of said crank pin;

biasing means for biasing said guide means to one of said locked and unlocked positions;

and actuator means operable to overcome said biasing means to move said guide means to the other of said locked and unlocked positions.

4. Apparatus according to claim 3 wherein said biasing means biases said guide means into locked position and wherein said actuator means moves said guide means to unlocked position.

5. Apparatus according to claim 3 or 4 wherein said actuator means comprises:

an actuator having an extendable and retractable actuator rod;

and lever means operatively connected between said actuator rod and said guide means.

6. Apparatus according to claim 5 wherein said lever means comprises:

- a first lever pivotally mounted on said power transmission mechanism and pivotally connected to said actuator rod;
- a second lever pivotally mounted on said feed crank;
- and means on said second lever for engaging said guide means, said second lever being pivotally movable by said first lever to effect movement of said guide means.

7. Apparatus according to claim 6 wherein, when said guide means are in locked position, said crank pin support member is secured to said feed crank and unable to slidably move transversely to said axis.

8. Apparatus according to claim 7 wherein said crank pin support member is wedged between said guide means and said feed crank.

9. Apparatus according to claim 1 or 2 wherein said biasing means biases said guide means into locked position and wherein said actuator means moves said guide means to unlocked position.

* * * * *